United States Patent
Nada

(10) Patent No.: US 6,389,921 B1
(45) Date of Patent: May 21, 2002

(54) WRIST MECHANISM OF INDUSTRIAL ROBOT

(75) Inventor: Minoru Nada, Shinminato (JP)

(73) Assignee: Nachi-Fujikoshi Corp., Toyama (JP)

( * ) Notice: Subject to any disclaimer, the term of this patent is extended or adjusted under 35 U.S.C. 154(b) by 0 days.

(21) Appl. No.: 09/634,993

(22) Filed: Aug. 8, 2000

(30) Foreign Application Priority Data

Aug. 12, 1999 (JP) .......................................... 11-228543

(51) Int. Cl.[7] .............................. B25J 17/02; B25J 18/00
(52) U.S. Cl. ............................... 74/490.02; 74/490.03; 74/490.05; 74/490.06; 464/117; 464/119; 901/23; 901/25; 901/28; 901/29
(58) Field of Search ......................... 74/490.02, 490.05, 74/490.06, 490.03; 464/117, 119, 148; 901/23, 25, 28, 29

(56) References Cited

U.S. PATENT DOCUMENTS

| | | | | |
|---|---|---|---|---|
| 4,068,536 A | * | 1/1978 | Stackhouse | 74/417 |
| 4,107,948 A | * | 8/1978 | Molaug | 464/148 |
| 4,671,732 A | * | 6/1987 | Gorman | 414/735 |
| 4,744,264 A | * | 5/1988 | Milenkovic | 74/490.06 |
| 4,807,486 A | * | 2/1989 | Akeel et al. | 74/490.06 |
| 5,212,432 A | * | 5/1993 | Ohtani et al. | 318/568.11 |
| 5,549,016 A | | 8/1996 | Nakako et al. | 74/490.02 |
| 6,014,909 A | | 1/2000 | Fiora | 74/490.02 |

* cited by examiner

Primary Examiner—Allan D. Herrmann
(74) Attorney, Agent, or Firm—Venable; Robert J. Frank; Gabor J. Kelemen

(57) ABSTRACT

A wrist mechanism of an industrial robot is described which have a first ring-shaped hollow reduction unit secured to an arm of the robot, and a first hollow drive tube and a second ring-shaped hollow reduction unit secured to an output shaft of the first reduction unit, respectively. The wrist mechanism further have a second hollow drive tube and a third ring-shaped hollow reduction unit secured to an output shaft of the second reduction unit, respectively, and a third hollow drive tube secured to an output shaft of the third hollow reduction unit rotatably around a first axis. The first, second and third hollow drive tubes are connected to first, second and third wrist elements, respectively, to rotate each of the wrist elements relative to each other, which leave a hollow space inside thereof free for passage of supply cables and pipes which are to be connected to a tool being secured to the robot wrist.

6 Claims, 4 Drawing Sheets

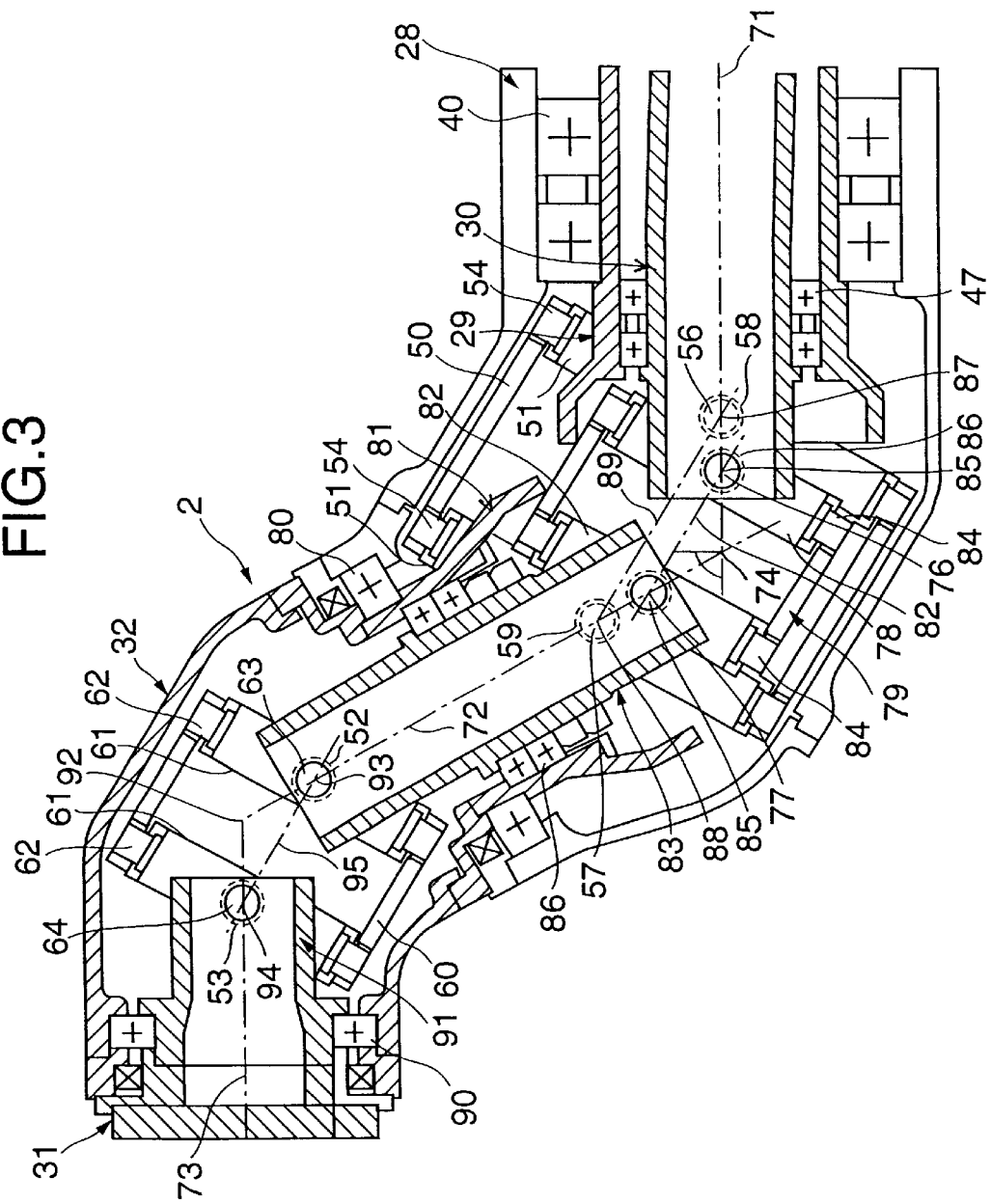

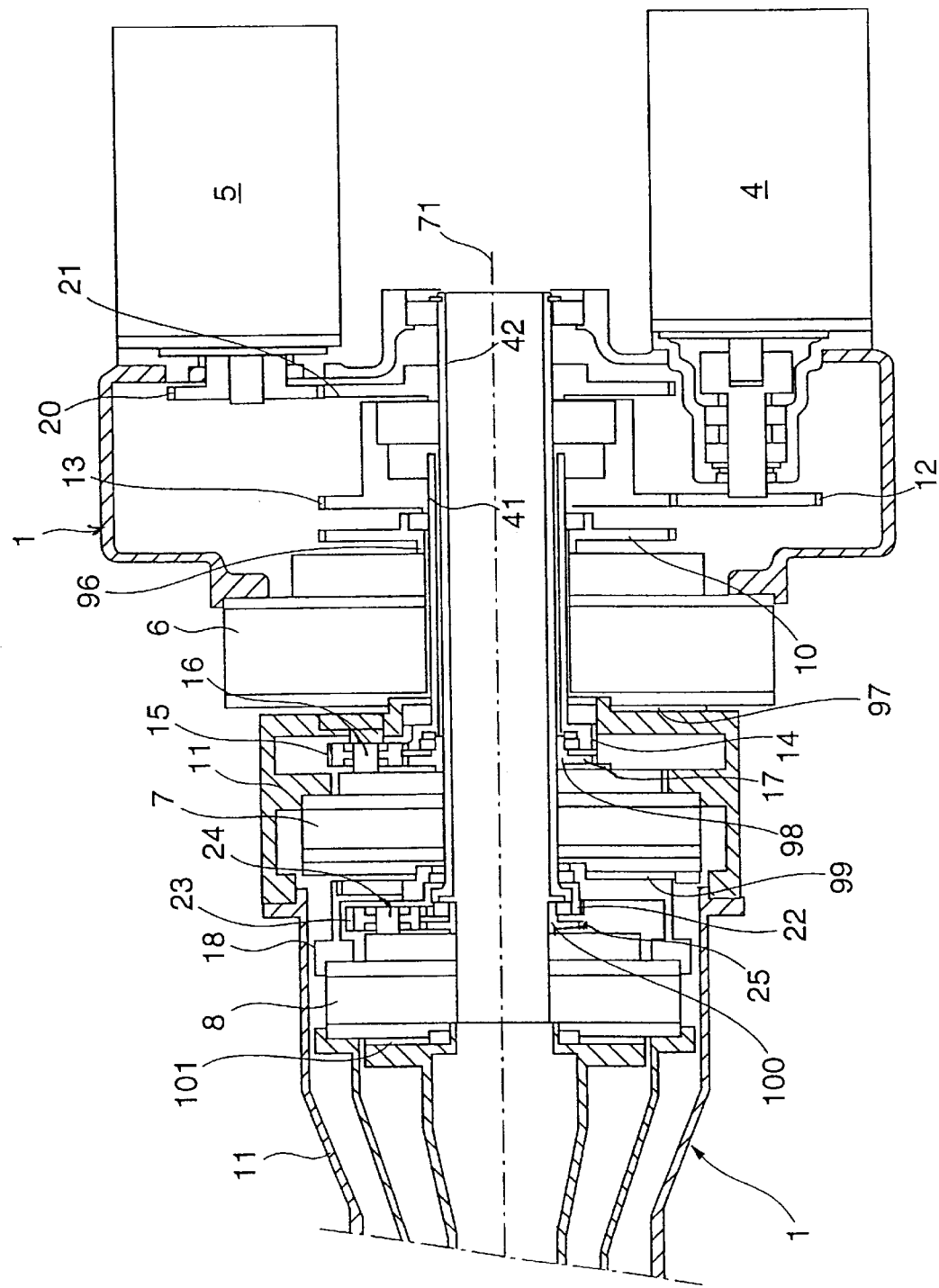

WRIST MECHANISM OF INDUSTRIAL ROBOT

BACKGROUND OF THE INVENTION

1. Field of the Invention

The present invention relates to a wrist mechanism of an industrial robot having three wrist elements rotatably supported by an arm of the robot relative to each other around respective rotation axes which are mutually inclined, which leave a hollow space inside thereof free for passage of supply cables and pipes which are to be connected to a tool being secured to the robot wrist.

2. Description of the Related Art

Such wrist mechanisms of the industrial robots having two or three wrist elements, which leave a hollow space inside thereof free for passage of supply cables and pipes, are disclosed, for instance, in U.S. Pat. No. 5,549,016. This patent discloses a robot wrist having two reduction units carried in the robot wrist to drive two wrist elements and a reduction unit to drive the first wrist element or entire robot wrist being carried in an arm of a robot. Recently, many supply cables and pipes are requested to house spaces within the inside the robot wrist for supplying electricity and fluid, such as pressurized oil or air etc. to a tool being secured to the robot wrist. To meet such a request, for example, U.S. Pat. No. 6,014,909 discloses a robot wrist having hollow drive tubes and hollow bevel gears for transmitting rotational movements leaving a hollow space inside thereof free for passage of supply cables and pipes. For transmitting rotational movements to wrist elements, U.S. Pat. No. 6,014,909 uses chains of gears as the final input transmitting members to each of the wrist elements. In cases where chains of gears are used as final input transmitting members, a difficulty arises in that positioning the wrist elements becomes unstable due to backlashes in the gears. Further, the positioning becomes more unstable due to flank wear of the gears suffering from high torques applied thereon, especially when robots are handling a heavy load, such as 100 kg. Another difficulty in positioning the wrist elements arises from a large amount of reflected or followed rotational movements of a third wrist element caused by rotational movements of first and second wrist elements, that is, since the first, second and third hollow drive tubes are independently supported by an arm of a robot adapted to drive first, second and third wrist elements relative to each other, a rotational movement of the first wrist element effects or follows those of the second and third wrist elements, as well as a rotational movement of the second wrist element effects or follows that of the third wrist element.

To eliminate these deficiencies, applicant proposed, in pending undisclosed or unpublished Japanese patent application No. 11 (1999)-31418, a robot wrist as shown in FIG. 3 of this application. However, more sufficient spaces for passage of the supply cables and pipes, and more stable positioning of wrist elements to reduce play between power transmitting elements are desirable.

SUMMARY OF THE INVENTION

An object of the present invention is to provide a wrist mechanism of an industrial robot which leaves a sufficient hollow space inside thereof free for passage of supply cables and pipes which are to be connected to a tool being secured to the wrist mechanism, wherein difficulties in positioning the wrist elements becoming unstable due to backlashes and flank wear in final input transmitting gears are eliminated and accuracies of controlling thereof are increased.

Another object of the present invention is to provide a wrist mechanism of an industrial robot wherein amounts of reflected rotational movements of second and/or third wrist elements affected by rotational movements of first and second wrist elements are made small, thereby the controllings of the positionings of positionings of wrist elements become easy and accuracies of controllings thereof are increased.

These and other objects are achieved according to a first aspect of the present invention by a wrist mechanism of an industrial robot comprising: a first ring-shaped hollow reduction unit secured to an arm of the robot, a first hollow drive tube and a second ring-shaped hollow reduction unit secured to an output shaft of the first reduction unit, respectively, a second hollow drive tube and a third ring-shaped hollow reduction unit secured to an output shaft of the second reduction unit, respectively, and a third hollow drive tube secured to an output shaft of the third hollow reduction unit rotatably around a first axis, further, said first, second and third hollow drive tubes being connected to the first, second and third wrist elements, respectively, to rotate each of the wrist elements relative to each other.

By such arrangements, by using the first, second and third ring-shaped hollow reduction units connect to the first, second and third hollow drive tubes, respectively, to rotate each of the first, second and third wrist elements connected thereto relative to each other, a sufficient hollow space is secured inside thereof free for passage of supply cables and pipes which are to be connected to a tool being secured to the third wrist element. Further, since no chains of gears are used as final input transmitting members to each of the wrist elements, amounts of backlashes and flank wear are eliminated, thereby difficulties in positioning the wrist elements becoming unstable due to backlashes and flank wear in the gears are eliminated, and accuracies of controllings thereof are increased.

Similarly, since amounts of reflected rotation movements of the second and/or third wrist elements affected by the rotational movements of the first and second wrist elements are reduced within each fraction of the reduction ratios of each of the reduction units, the resulting amounts of their reflected rotational movements are small, thereby positioning the wrist elements becomes easy and accuracies of controllings thereof are increased.

The above objects are also achieved according to a second aspect of the present invention by a wrist mechanism of an industrial robot comprising: a first, second and third hollow drive tubes rotatably supported by an arm of the robot relative to each other coaxially around a first axis, said second and third hollow drive tubes being connected to second and third hollow connecting members, respectively; a first hollow wrist element secured to and supported by the first drive tube rotatably around the first axis; a second hollow wrist element secured to a hollow second wrist element supporting member being supported by the first wrist element rotatably around a second axis inclined with respect to the first axis; said second wrist element supporting member being connected with the second connecting member via a universal joint which comprises, two pairs of radial shafts each pair thereof being rotatably secured to each members, respectively, on each two positions crossing with a diametrical line passing through a point lying on each axes of the members at even intervals from an apex on which the axes of the members cross, two tublar rings respectively secured to each pair of the radial shafts, two pairs of axial bearings rotatably secured to the two tublar rings on their respective portions 90° circumferentially offset from the radial shafts, respectively, and a pair of connecting bars both ends of which being secured to the two pairs of axial bearings, respectively, thereby the connecting bars connecting two tublar rings together, thereby connecting the second connecting member and the second wrist element supporting member; and a third hollow wrist element secured to a hollow third wrist element supporting member being supported by the second wrist element rotatably around a third axis inclined with respect to the second axis; further, said third wrist element supporting member is connected with the third hollow connecting member via a forth hollow connecting member rotatably supported by the second wrist element supporting member, via each of the universal joints on both sides of the forth connecting member.

By such arrangements, since no chains of gears are used as final input transmitting members to each of the wrist elements, difficulties in positioning the wrist elements becoming unstable due to backlashes and flank wear in the gears are eliminated, and accuracies of controllings thereof are increased. And, since power transmissions are performed by using universal joints having radial shafts, two tubular rings and connecting bars which have tougher strengths than those of a chain of gears, a more compact and tougher wrist mechanism is provided which is able to handle a high load secured to the wrist mechanism. Further, because the connecting bars of the universal joints rotate substantially at a uniform speed, and do not rotate unevenly, reflected rotational movements of the second and/or third wrist elements affected by the rotational movements of the first and second wrist elements are made to rotate substantially at a uniform speed, thereby positioning the wrist elements becomes easy.

BRIEF DESCRIPTION OF THE DRAWINGS

FIG. 3 is a partial enlarged side cross-sectional view showing a robot wrist 2 shown in FIG. 1 having first, second and third wrist elements.

FIG. 4 is a close up side cross-sectional view of FIG. 1 showing the three reduction units 6, 7 and 8.

DETAILED DESCRIPTION OF THE PREFERRED EMBODIMENTS

Figure 1:
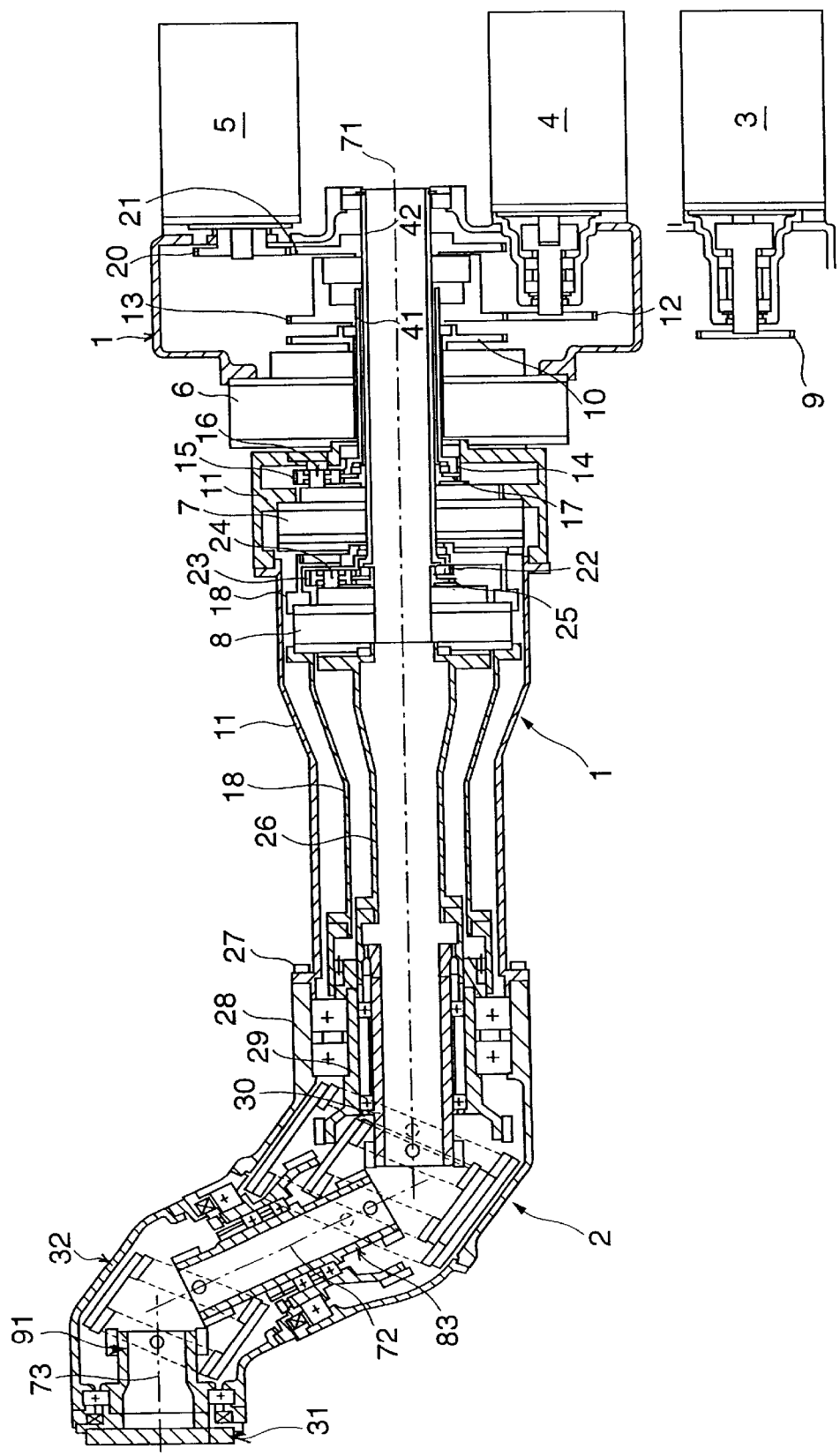
FIG. 1 is a general side cross-sectional view showing an embodiment of a wrist mechanism of an industrial robot of the present invention.

This invention will now be described, by way of example, with reference to the accompanying drawings. FIG. 1 is a general side cross-sectional view showing a preferred embodiment of a wrist mechanism of an industrial robot of the invention having a robot arm 1 and a robot wrist 2. The robot wrist 2 will be more precisely described later with reference to FIG. 3, which is a drawing in applicant's undisclosed or unpublished Japanese patent application No. 11 (1999)-31418, however, other types of robot wrists may be used. A first hollow drive tube 11 supports a first wrist element 28 rotatably around a first axis 71. As more precisely described with reference to FIG. 3 later, a second hollow drive tube 18 is connected with a second wrist element 32 via a second hollow connecting member 29 and a second wrist element supporting member 81 which is supported by the first wrist element 28 rotatably around a second axis 72, and a third hollow drive tube 26 is connected with a third wrist element 31 or tool flange via third and fourth hollow connecting members 30, 83 and a third wrist element supporting member 91 which is supported by the second wrist element 28 rotatably around a third axis 73, independently relative to each other.

As shown in FIG. 1, a first motor 3 secured to the robot arm 1 is mounted for driving the first wrist element 28 of the robot wrist 2 in the following manner. A gear 9 secured to a shaft of the first motor 3 meshes with a first gear 10, and the first gear 10 is secured to an input shaft 96 of a first ring-shaped hollow reduction unit 6 secured to the robot arm 1 and drives the first reduction unit 6. The first hollow drive tube 11 and a second ring-shaped hollow reduction unit 7 are secured to an output shaft 97 of the first reduction unit 6, respectively. In FIG. 1, the second reduction unit 7 is secured to and supported by the output shaft 97 of the first reduction unit 6 via the first drive tube 11, however, the first drive tube 11 may be secured directly to the second reduction unit 7 secured to the output shaft 97 of the first reduction unit 6. The other end of the first drive tube 11 supports and rotates the first wrist element 28 around the first axis 71.

A second motor 4 secured to the robot arm 1 is mounted for driving the second wrist element 32. A gear 12 secured to a shaft of the second motor-4 meshes with a gear 13 secured to one end of a hollow shaft 41 supported rotatably around the first axis 71, and a second gear 14 secured to the other end of a hollow shaft 41 meshes with planetary gears 15 (three planetary gears 15 only one of which is shown) secured to planetary gear shafts 16 (three planetary gear shafts 16 only one of which is shown) which are supported by the first drive tube 11 rotatably around their own axes and around the first axis 71, respectively. The planetary gears 15 mesh with an input gear 17 secured to an input shaft 98 of the second reduction unit 7, and rotate the same. A second drive tube 18 and a third ring-shaped hollow reduction unit 8 are secured to an output shaft 99 of the second reduction unit 7, respectively. The distal end of the second drive tube 18 is secured for rotating the second wrist element 32 via both a second hollow connecting member 29 and a second wrist element supporting member 81.

A third motor 5 secured to the robot arm 1 is mounted for driving the third wrist element 31 adapted to mount the tool, in a similar following manner. A gear 20 secured to a shaft of the third motor 5 meshes with a gear 21 secured to one end of a hollow shaft 42 supported rotatably inside the hollow shaft 41 by the robot arm 1. A third gear 22 secured to the other end of the hollow shaft 42 meshes with planetary gears 23 (three planetary gears 23 only one of which is shown) secured to planetary gear shafts 24 (three planetary gear shafts 24 only one of which is shown) supported by the second drive tube 26. The planetary gears 23 are mounted rotatably around their own axes and around the first axis 71, respectively. The planetary gears 23 mesh with an input gear 25 secured to an input shaft 100 of the third reduction unit 8, and rotates the same. The third drive tube 26 is secured to and supported by an output shaft 101 of the third reduction unit 8 and is rotated by the same. The distal end of the third drive tube 26 is secured to and rotates the third wrist element 31 via third and fourth hollow connecting members 30, 83 and a third wrist element supporting member 91.

In operation, when the second gear 14 secured to the other end of the hollow shaft 41 is in a fixed condition, since a rotation of the planetary gears 15, secured to the planetary gear shafts 16 secured to the first drive tube 11, around the second gear 14, effect rotations around their own axis and around the input gear 17 secured to the input shaft 98 of the second reduction unit 7 and rotates the same around the first axis 71. This means the planetary gears 15 absorb a reflected or followed rotational movement of the first drive tube 11. Thereby, a rotational movement of the hollow shaft 41 by the second motor 4 effects the same amount of rotational movement of the input shaft 98 of the second reduction unit 7 and rotates the same independently of the rotation of the first drive tube 11. Thus. no compensational reverse rotational movement corresponding to the amount of the reflected or followed rotational movement of the first drive tube 11 is necessary. The same effect will be obtainable if the input shaft 98 of the second reduction unit 7 is directly connected to a so-called built-in motor, in place of the second gear 14 and the planetary gears 15. Such a built-in motor may be applicable to each of input shafts of the first and third reduction unit 6, 8.

For securing the robot arm to the robot wrist 2, the first drive tube 11 may be connected to the first wrist element 28 by tightening bolts 27 shown in FIG. 1, however, since connecting members between the second drive tube 18 and the second hollow connecting member 29, and between the third drive tube 26 and the third hollow connecting 30, are housed within the robot wrist 2, bolts are not accessible from the outside thereof. For this reason, connections using involute splines etc. are applied, which result in deficiencies in unstable positionings of the wrist elements due to plays in the splines etc.

Figure 2:
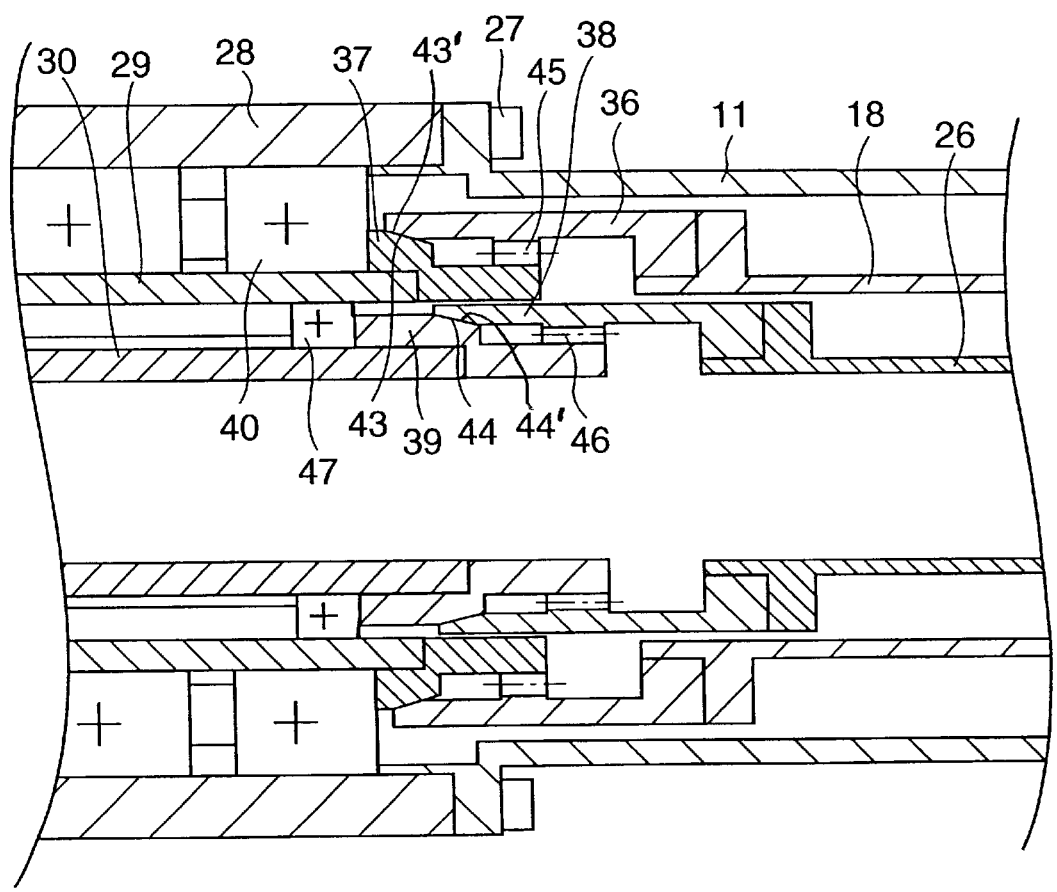
FIG. 2 is a partial enlarged side cross-sectional view of FIG. 1 showing connections between a second hollow drive tube with a hollow connecting member, and between a third hollow drive tube with a third hollow connecting member.

Preferably, as shown in FIG. 2, concave tapered surfaces 43', 44' formed on respective hollow extension members 36, 38 of the second and third drive tubes 18, 26, and the convex tapered surfaces 43, 44 formed on respective second and third hollow connecting members 29, 30 being adapted to connect with the second and third wrist elements, are made to form tapered contacting surfaces 43, 43', 44, 44', and the tapered contacting surfaces 43, 43', 44, 44' are interfere fitted and secured to each other by tightening bolts 27 adapted to secure the first wrist element 28 with the first drive tube 11 and thereby axially moving bearings 40, 41 secured to the first wrist elements 28 and the second hollow connecting member 29, respectively. Thus, deficiencies in unstable positionings of the wrist elements due to play in the splines etc. are eliminated. For safety, splines 45, 46 are used together with the tapered contacting surfaces 43,43', 44, 44'.

With reference to FIG. 3, more detailed description of the robot wrist 2 shown in FIG. 1 having first, second and third wrist elements 28,32,31 will be given hereunder. The first wrist element 28 is secured to the first drive tube 11 rotatably around the first axis 71. The second wrist element 32 is supported by the second wrist element supporting member 81 supported by the first wrist element 28 via bearing 80 rotatably around the second axis 72 inclined with respect to the first axis 71. The second and third hollow drive tubes 18,26 are connected with the second and third hollow connecting members 29,30 (FIG. 2), respectively. The second wrist element supporting member 81 is connected with the second hollow connecting member 29, by a universal joint which comprises, two pairs of radial shafts 56,57 each pair thereof being secured to the second hollow connecting member 29 and the second wrist element supporting member 81 rotatably around their own axes, respectively, on each two positions crossing with a diametrical line passing through a pair of points 87,88 lying on each axes 71,72 of the members 29,81 at even intervals from an apex 74 on which axes 71,72 of the members 29,81 cross, two tublar rings 51,51 respectively secured to each pair of the radial shafts 56,57, two pairs of axial bearings 54,54 rotatably secured to the two tublar rings 51,51 on their respective portions 90° circumferentially offset from the radial shafts 56,57, and a pair of connecting bars 50,50 both ends of which being secured to the two pairs of axial bearings 54,54 respectively. Thereby the connecting bars 50,50 connect two tublar rings 51,51, and connect the second hollow connecting member 29 and the second wrist element supporting member 81 together via bearings 58,59. The pair of the connecting bars 50,50 are made to rotate around line 89 extending between the pair of points 87,88.

The third wrist element supporting member 91 is connected with the fourth hollow connecting member 83 rotatably supported by the second wrist element supporting member 81 via bearings 86, and further, the fourth hollow connecting member 83 is connected with the third hollow connecting member 30 rotatably supported by the second hollow connecting member 30 rotatably supported by the second hollow connecting member 29 via bearings 47 around the third axis 73 inclined with respect to the second axis 72. Connections on both sides of the fourth connecting member 83 with the third hollow connecting member 30 and the third wrist element supporting member 91 are connected via each of the universal joints in the same manner as described earlier.

That is, the third connecting members 30 is connected with the fourth connecting member 83 by a universal joint which comprises, two pairs of radial shafts 85, 85, each pair thereof being secured to the third connecting members 30 and the fourth connecting member 83, rotatably around their own axes, respectively, on each two positions crossing with a diametrical line passing through a pair points 76, 77 lying on each axes 71, 72 of the members 30, 83 at even intervals from an apex 74 on which axes 71, 72 of the members 30, 83 cross, two tubular rings 82, 82 respectively secured to each pair of the radial shafts 85, 85, two pairs of axial bearings 84, 84 rotatably secured to the two tubular rings 82, 82 on their respective portions 90° circumferentially offset from the radial shafts 85, 85, and a pair of connecting bars 79, 79, both ends of which being secured to the two pairs of axial bearings 84, 84 respectively. Thereby, the connecting bars 79, 79 connect two tubular rings 82, 82, and connect the third and fourth connecting members 30, 83 together via bearings 86, 86. The pair of connecting bars 79, 79 are made to rotate around line 78 extending between the pair of points 85, 85.

The third wrist element supporting member 91 is rotatably supported around the third axis 73 by the second wrist element 32 via bearing 90 and secures the third wrist element 31 at its distal end. And the fourth connecting members 83 is connected with the third wrist element supporting member 91 by a universal joint which comprises, two pairs of radial shafts 63,64 each pair thereof being secured to the fourth connecting members 83 and the third wrist element supporting member 91 rotatably around their own axes, respectively, on each two positions crossing with a diametrical line passing through a pair of points 93,94 lying on each axes 72,73 of the members 83,91 at even intervals from an apex 92 on which axes 72,73 of the members 83,91 cross, two tublar rings 61,61 respectively secured to each pair of the radial shafts 63,64, two pairs of axial bearings 62,62 rotatably secured to the two tublar rings 61,61 on their respective portions 90° circumferentially offset from the radial shafts 63,64, and a pair of connecting bars 60,60 both ends of which being secured to the two pairs of axial bearings 62,62 respectively. Thereby the connecting bars 60,60 connect two tublar rings 61,61, and connect the fourth connecting members 83 and the third wrist element supporting member 91 together via bearings 52,53. The pair of the connecting bars 60,60 are made to rotate around line 95 extending between the pair of points 93,94.

By changing diameters between the connecting bars 50, 50; 60, 60, interferences between members 30, 83, 91 are eliminated. For the reason that power transmissions are performed by the universal joints each having radial shafts, two tubular rings and connecting bars, each of which having tougher strengths than those of a chain of gears, a more compact and tougher wrist mechanism is provided which is able to handle a high load secured to the robot wrist. Further, the connecting bars of the universal joints rotate substantially at a uniform speed, and do not rotate unevenly. This means that, in the embodiment shown in FIG. 3, amounts of reflected rotational movements of the second and/or third wrist elements affected by the rotational movements of the first and second wrist elements are effected to rotate substantially at a uniform speed, thereby positioning the wrist elements becomes easy.

What is claimed is:

1. A wrist mechanism of an industrial robot comprising:

first, second and third wrist elements, a first ring-shaped hollow reduction unit secured to an arm of the robot, a first hollow drive tube and a second ring-shaped hollow reduction unit secured to an output shaft of the first reduction unit, respectively, a second hollow drive tube and a third ring-shaped hollow reduction unit secured to an output shaft of the second reduction unit, respectively, and a third hollow drive tube secured to an output shaft of the third hollow reduction unit rotatably around a first axis;

said first, second and third hollow drive tubes being connected to the first, second and third wrist elements, respectively, to rotate each of the wrist elements relative to each other.

2. The wrist mechanism of an industrial robot claimed in claim 1, wherein said first, second and third reduction units and said third drive tube leaving a sufficient hollow space inside thereof free for passage of supply cables and pipes which are to be connected to a tool being secured to the third wrist element.

3. The wrist mechanism of an industrial robot claimed in claim 1, wherein each input shafts of the second and third reduction units is secured to second and third gears each of which meshes with second and third planetary gears mounted on the first and second reduction units respectively and rotatably on their own and around the first axis.

4. The wrist mechanism of an industrial robot claimed in claim 2, wherein each input shafts of the second and third reduction units is secured to second and third gears each of which meshes with second and third planetary gears mounted on second and third planetary gear shafts which are mounted on the first and second reduction units respectively, said second and third planetary gears being mounted rotatably around their own and around the first axis.

5. The wrist mechanism of an industrial robot claimed in claim 1, wherein the second and third drive tubes have concave tapered surfaces on respective hollow extension members and second and third hollow connecting members being adapted to connect with the second and third wrist elements have convex tapered surfaces, said concave tapered surfaces and convex tapered surface forming tapered contacting surfaces, and the tapered contacting surfaces being interfere fitted and secured to each other by tightening bolts adapted to secure the first wrist element with the first drive tube and thereby axially moving bearings secured to the first wrist element and the second hollow connecting member, respectively.

6. A wrist mechanism of an industrial robot comprising:

a first, second and third hollow drive tubes rotatably supported by an arm of the robot relative to each other coaxially around a first axis, said second and third hollow drive tubes being connected to second and third hollow connecting members, respectively;

a first hollow wrist element secured to and supported by the first drive tube rotatably around the first axis;

a second hollow wrist element secured to a hollow second wrist element supporting member being supported by the first wrist element rotatably around a second axis inclined with respect to the first axis;

said second wrist element supporting member being connected with the second connecting member via a universal joint which comprises, two pairs of radial shafts each pair thereof being rotatably secured to each of the members, respectively, on each of two positions crossing with a diametrical line passing through a point lying on each axes of the members at even intervals from an apex on which the axes of the members cross, two tubular rings respectively secured to each pair of the radial shafts, two pairs of axial bearings rotatably secured to the two tubular rings on their respective portions 90° circumferentially offset from the radial shafts, respectively, and a pair of connecting bars both ends of which being secured to the two pairs of axial bearings, respectively, thereby the connecting bars connecting two tubular rings together, thereby connecting the second connecting member and the second wrist element supporting member; and a third hollow wrist element secured to a hollow third wrist element supporting member being supported by the second wrist element rotatably around a third axis inclined with respect to the second axis;

said third wrist element supporting member being connected with the third hollow connecting member via a fourth hollow connecting member rotatably supported by the second wrist element supporting member via universal joints on both sides of the fourth connecting member.

* * * * *